United States Patent Office 3,216,330
Patented Nov. 9, 1965

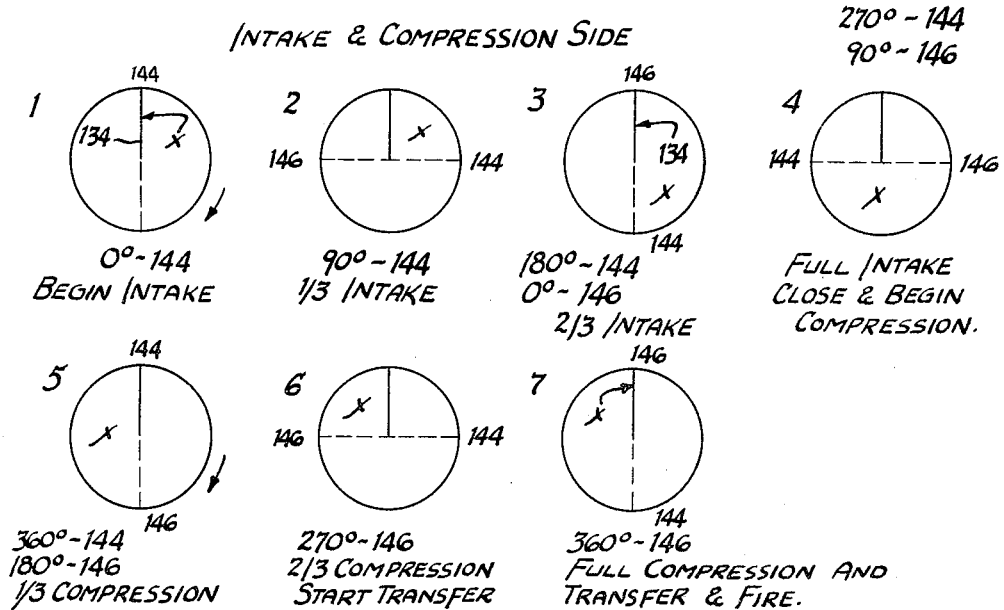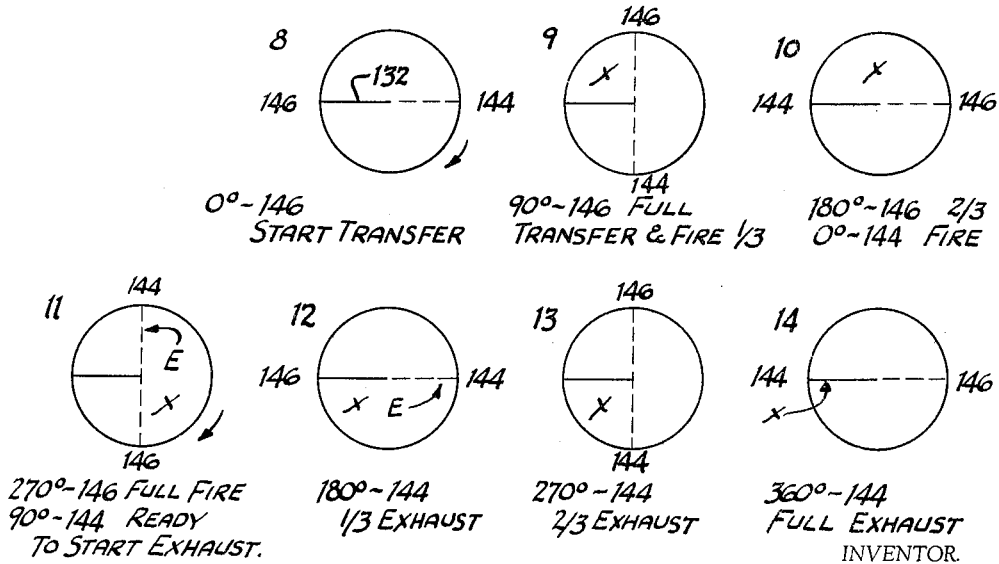
Fig. 4

3,216,330
ROTARY INTERNAL COMBUSTION ENGINE
Arturo F. Heger, 280 Farallon, Mexico City, Mexico
Filed Feb. 5, 1963, Ser. No. 256,315
8 Claims. (Cl. 91—82)

This invention relates to rotary internal combustion engines, and more particularly to a rotary engine utilizing a rotatable combustion chamber and a rotating transfer chamber; the engine comprising only two basic moving parts and being characterized by simplified and accurate transfer valving.

ESSENCE OF THE PRIOR ART

Rotary engines utilizing two canted shafts have been disclosed as early as 1907, typified by Heberling Patent 865,891, issued in that year. The fact that these engines have never become commercially successful indicates certain fundamental flaws of design such as porting, transfer of gases on the compression and intake strokes, overly complex valving and the like. Thus, typical prior engines have been unduly complex and costly.

Accordingly, a novel rotary engine characterized by few moving parts as contrasted to conventional reciprocating engines of high thermal efficiency, low maintenance characteristics and ease and economy of manufacture would provide a substantial contribution to the art.

OBJECTS

It is, therefore, an important object of the present invention to provide a novel rotary internal combustion engine.

A further object is to provide a novel rotary internal combustion engine characterized by few parts with concomitant ease and economy of manufacture.

A further object is to provide a novel rotary internal combustion engine utilizing three shafts having their axes inclined relative to one another and carrying the equivalent of three plates that run in tangential contact to form the equivalent of two cylinder heads spaced 90° from one another.

A still further object is to provide a novel rotary internal combusion engine utilizing a minimum number of moving parts and characterized by simple carburetion and efficient air cooling.

A further object is to provide a novel rotary engine wherein a third disc, canted relative to other two discs forming the composite engine, provides intake and compression chambers having a greater volume capacity than the combustion and exhaust chambers; thus producing the effect of supercharging in a very simple and novel manner.

A further object of the invention is to provide a novel rotary internal combustion engine where the valves are positively actuated by rotation of the three component elements and therefore are always properly and accurately timed.

A further object is to provide a novel rotary internal combustion engine wherein the compression ratio can be varied according to the rotative speed of the engine to accommodate different octane fuels, this being effected during operation.

A further object is to provide a novel rotary construction capable of use as an internal combustion engine, a fluid pump or a fluid motor.

Other objects of this invention will appear in the following description and appended claims, reference being had to the accompanying drawings forming a part of this specification wherein like reference characters designate corresponding parts in the several views.

THE DRAWINGS

FIGURE 4 is a schematic diagram further illustrating operation of the invention.

Figure 1:
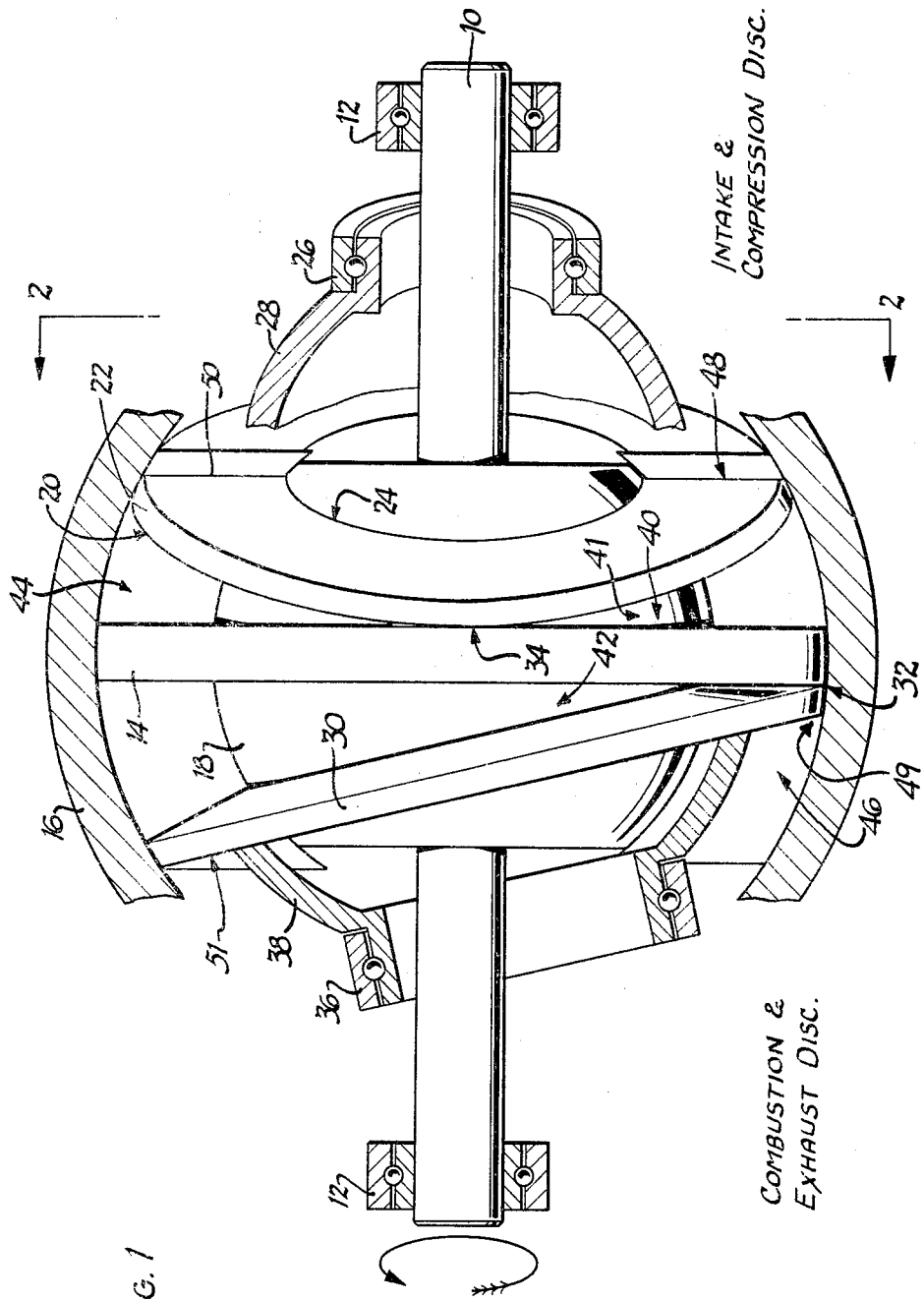
FIGURE 1 is a schematic top plan view illustrating the engine of invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

PERSPECTIVE VIEW

Briefly, the present invention relates to a novel rotary internal combustion engine having the following characteristics:

(1) A so-called main or power shaft establishing the general axis of the engine and carrying a center disc, hereinafter described as the power transmitting disc. Outer and inner spheres are formed integrally on the interior and exterior peripheries of the center disc and thus form the main housing or block of the engine.

(2) A second disc having an axis inclined relative to the main shaft and that forms the intake and compression chambers of the engine.

(3) A third disc having an axis inclined relative to the main shaft and that provides the combustion and exhaust chambers of the engine.

(4) Carried by the main disc and extending between the inner and outer spheres and the second and third discs are two radial walls that separate the intake-compression and combustion-exhaust chambers into plural cavities. These rotate with the center disc.

The radial walls contain built-in transfer ports; also, the radial walls carry sliding fins or vanes that are actuated by movement of the second and third discs toward and away from one another. By the to-and-fro movement of the discs in relation to one another and to the center disc, or main disc, the fins within the separting walls slide back and fourth causing the ports to open and close at precisely the right time.

(5) By placing the tangential contact of the two auxiliary discs to the main disc 90° apart, a number of advantages will become apparent as discussed hereinafter. A most important one being that this 90° difference may be changed slightly during operation of the engine to change the compression ratio.

(6) The separting walls alluded to above carry the spark plugs; and the distributor is mounted directly on the main shaft providing a very concise structure.

(7) The carburetor is either of conventional or specialized design, as will become apparent hereinafter; this is also of simplified construction; and centrifugal forces are utilized in a turbo-compressor or supercharger type operation to facilitate the flow of combustible gases into the intake chamber for greatest efficiency.

In view of the foregoing brief description pointing out the simplicity of the invention, the fact that all components are provided for a completely operable internal combustion engine, and the fact that a substantial contribution is provided to the art, a complete and accurate description of all aspects of the invention will now be provided.

THE INVENTION

The main shaft and center disc

By reference to FIGURE 1, the main shaft is designated by the reference numeral 10 and has anti-friction bearings 12 providing rotatable support at each end. It is of course to be understood that the bearings 12 are carried within or by suitable supports comprising part of an engine frame. However, in order to facilitate a proper understanding of the principle of the engine, all unnecessary engine support details have been omitted to provide greatest clarity. Reference to the Heberling Patent 865,-891, dated 1907, typically illustrates the manner in which an engine base plate can be provided.

Centrally of the main shaft 10, there is provided what we shall call the central or power disc. This is designated by the reference numeral 14, and this central or power disc is perpendicular to the axis of the main shaft 10.

It is important to note that the housing or block of the engine comprises two parts; to-wit:

(1) A so-called outer housing or sphere designated by the reference numeral 16 and suitably fitted with heat dissipating fins, not shown.

(2) Also, the block includes an inner sphere designated by the reference numeral 18.

It is to be understood that spheres 16 and 18 are formed to operate integrally with the center disc 14. Thus, the center disc 14, the outer sphere 16 and the inner sphere 18 all rotate together as a unit; and the other components of the engine to be hereinafter described operate in conjunction with these elements.

The intake and compression disc

Referring to FIGURE 1, note the intake and compression disc, designated by the reference numeral 20. The disc 20 is of annular configuration with its outer periphery 22 contoured to mate the inner periphery of the outer sphere 16. The inner periphery is designated 24 and is generated from the same center as the inner sphere 18. It should be noted that the inner sphere 18 and the outer sphere 16 are developed from a common center that is on the axis of the center shaft 10.

Note that the axis of the intake and compression disc 20 is canted relative to the axis of the main shaft 10. Thus, in the top plan view of FIGURE 1, the contact line between the intake and compression disc 20 and the center disc or power disc 14 is at dead top. This is designated 34.

The compression disc 20 is mounted in a bearing 26 and an annular web wall 28 or its equivalent is used for support between the bearing 26 and the intake and compression disc 20. Bearing 26 is of course carried in a suitable support.

The combustion and exhaust disc

From the foregoing description, it will be noted that the axis of the intake and compression disc 20 is canted in a vertical plane relative to the axis of the power disc 14 and main shaft 10.

Now by continued reference to FIGURE 1, note the combustion and exhaust disc on the other side of the power disc 14 and designated by the reference numeral 30. Note that the axis of this disc is also canted relative to the axis of the power disc 14, main shaft 10, but in a horizontal plane as distinguished from the vertical plane of the intake and compression disc 20. This provides a line of contact 32 which is oriented 90° from the line of contact 34 between the disc 20, power disc 14.

The line contact 32 provides a cylinder head the same as the line contact 34.

Note that the combustion and exhaust disc 30 is mounted in essentially the same manner as the intake and compression disc 20. Thus, a bearing 36 is positioned in a suitable support and the web wall 38 provides the connection between bearing 36 and the combustion and exhaust disc 30, it being noted that the web wall 38 provides a clearance around the inner sphere 18.

The radially extending separating walls

To further complete the engine of invention, it must be understood that a cavity designated by reference numeral 40 is thus defined between inner sphere 18, outer sphere 16 and intake and compression disc 20. It must also be understood that a cavity designated by the reference numeral 42 is also defined between inner sphere 18 and outer sphere 16 and combustion and exhaust disc 30.

Now by reference to the chamber 40, this must be visualized as being annular in shape, and starting from the contact line 34 gradually develops in cross section or width until it reaches a maximum width. This width point is located 180° away from line 34; and then for the next 180° gradually tapers back to zero at line 34. The same can be said for the chamber 42, its development and return being from the line 32.

Thus, there are two principal chambers formed respectively by the coaction of the intake and compression disc 20 and the combustion and exhaust disc 30 with the power disc 14.

Now, in accordance with the present invention, one or more walls are attached to the power disc 14 to separate the chambers 40 and 42 into additional subchambers.

Thus, formed integrally with and positioned perpendicular to the power disc 14, is a separating wall 44. This wall 44 thus moves with the power disc 14. It must be understood that the separating wall 44 while integral with power disc 14, outer sphere 16 and inner sphere 18 is not however integral with the intake and compression disc 20 or the combustion and exhaust disc 30. Thus, these latter discs are slotted as at 50 and 51, and the slots are provided with sliding seals so that during rotation of the engine, the walls 20 and 30 can slide back and forth, so to speak, relative to the wall 44.

If we now look at the bottom of FIGURE 1, or 180° from the wall 44, to-wit, contact line 32, we will see a similar separating wall designated by the reference numeral 46. It is to be understood that the wall 46 is also formed integrally with power disc 14, outer sphere 16 and inner sphere 18. Also, slots are provided in intake and compression disc 20 and combustion-exhaust disc 30 as at 48 and 49 to accommodate the wall 46. The slots are provided with suitable shoe-type sliding seals to accommodate relative movement between walls 20 and 30 and wall 46.

SUMMARY

In view of the foregoing, the basic components of the engine of invention can be broken down as follows:

(1) Main shaft 10, power disc 14, outer sphere 16, inner sphere 18 forming one unit of the cylinder block. Note that these are all made in the form of circles for easy machining and fabrication.

(2) Intake and compression disc 20 canted relative to the axis of main shaft 10 and canted in a vertical plane to provide a line contact or first cylinder head at 34.

(3) Combustion and exhaust disc 30 canted in a horizontal plane relative to the axis of the main shaft 10 to provide a line contact or second cylinder head at 32. Note that the contact points 32 and 34 are spaced 90°.

(4) So-called separating and transfer walls 44 and 46 which subdivide the cavities 40 and 42.

MORE SPECIFIC DESCRIPTION BASED UPON THE PRIOR SCHEMATIC DESCRIPTION

Figure 2:
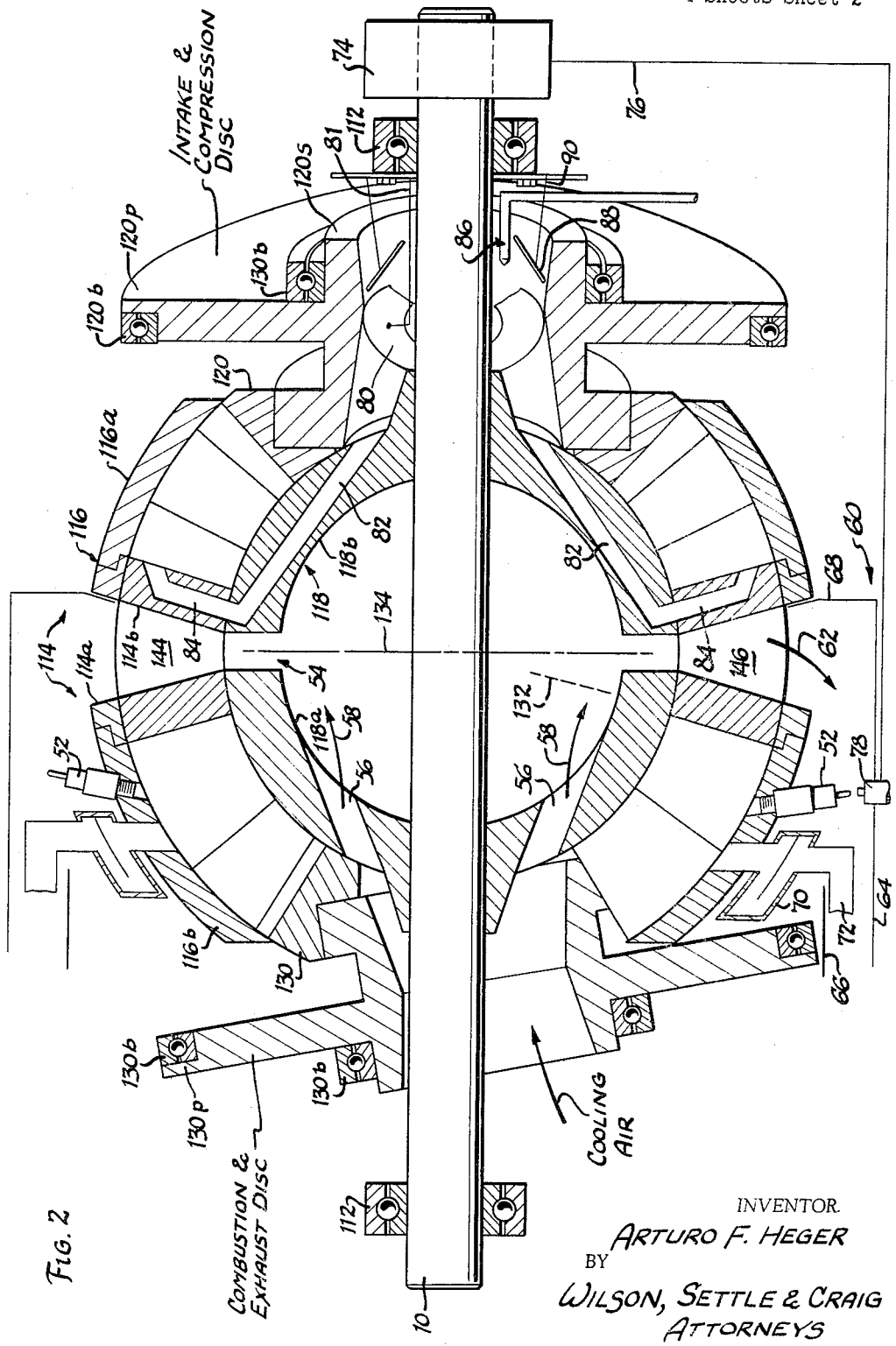
FIGURE 2 is a longitudinal section view taken along the line 2—2 of FIGURE 1.

Referring now to FIGURE 2 of the drawings, it will be noted that the main shaft is designated by the reference numeral 10. It should also be pointed out that the fundamental principles set forth in FIGURE 1 are followed throughout the following description of FIG- URE 2. In view of the fact, however, that the actual configuration of parts departs somewhat from the schematic elements shown in FIGURE 1, different reference numerals will be applied adding a prefix 100 where appropriate. Thus, the main shaft is carried within bearings 112. The outer sphere is designated by the reference numeral 116 and the inner sphere 118. Note that the inner sphere is hollow for air circulation as will be later described. Further note that inner sphere 118 is split into two halves, 118a and 118b for ease of machining. Note also that outer sphere is made in two halves 116a and 116b for the same reason.

As regards the power disc, it is here designated 114. However, as distinguished from FIGURE 1, it is made as a split element having two sides 114a and 114b. This in effect forms two spaced annular walls. These are tied together by the separating walls 144 and 146, and it should be pointed out at this time that the separating walls 144 and 146 carry no only self-contained ports but also carry sliding vanes for transferring gases. These will be discussed relative to FIGURE 3 of the drawings. Also, note that these separating walls 144 and 146 carry spark plugs 52; that is to say these plugs actually may be retained by the half 116b of outer sphere 116, but in communication with ports within the separating walls 144 and 146.

Having established the main shaft 10, its bearing 112, the power disc 114, the outer sphere 116, inner sphere 118 and separating walls 144 and 146, we turn now to the other elements making up the unit.

*Intake and compression disc*

Thus, the intake and compression disc is designated 120 and is supported by a large annular plate 120p supported on bearings 120b. The bearings 120b are mounted in a suitable support in spaced relation to the support for bearings 112. It will be understood that the contact point or cylinder head is on an imaginary line above the surface of the drawing paper designated 134. We thus establish that intake and compression disc 120 forms a cavity on the right side of the transverse center line of the engine and that this cavity is divided by the separating walls 144 and 146 spaced 180° apart as discussed in FIGURE 1. Reverting to FIGURE 1 for a moment, it is to be understood in connection with the contact point 34, that depending upon the position of the separating walls 44 and 46, the cavity 40 will sometimes be in three sections and sometimes when a separating wall is at the point 34 will simply be in two sections. Thus, viewing FIGURE 1, it is to be understood that if rotation were in the arrow direction, the small triangular cavity 41 will be understood to be decreasing toward a zero point. As will be discussed later, when this happens, compressed gases are being transferred through wall 14 to the cavity 42 for combustion and exhaust. The same principle is involved in FIGURE 2. This will also be brought out more fully in discussing FIGURE 4.

*The combustion and exhaust disc*

The combustion and exhaust disc in FIGURE 2 is designated by the reference numeral 130. This is carried by a support plate 130p mounted in bearings 130b. It will be understood that the point of contact between the combustion and exhaust disc and the center disc 114 is at a line or cylinder head 132, 90° forward of cylinder head 134.

Having now defined and established the principal component parts of the invention for FIGURE 2, elaboration will now be made relative to the various configurations of ancillary parts, including air cooling, carburetor, ignition system and exhaust system. Transfer valving is also discussed relative to operation, below.

*Air cooling*

Note that the two halves 118a and 118b of inner sphere 118 are axially spaced enough to allow an air current to be moved radially. This is brought about by centrifugal force, and plus the fanning action of the bridging walls 144 and 146 in the space 54 between the halves 118 and 118b. Of course, inlet ports are provided around the shaft 10 at 56; cooling air comes in by the direction indicated by the arrows 58.

Note that a hood 60 is provided in surrounding relation to the machine to carry away heated air in the direction indicated by the arrow 62. Hood 60 is of annular configuration with an outer wall 64 and an inner wall 66. A radially extending wall 68 provides close running relation to the machine to receive the warmed air coming through space 54.

*Exhaust system*

The exhaust from the combustion chamber passes through a miniature donut shaped muffler designated 70, and its outlet 72 is directed into the housing 60 downstream from the walls 144 and 146. Thus, the exhaust is admixed with the effluent cooling air moving along the arrow line 62 and is thereby dispersed to the ambient atmosphere.

*The ignition system*

The spark plugs have been alluded to before and designated by the reference numeral 52. Note that there is one at each of the wall 144 and 146 positions. It should be pointed out that the distributor is designated by the reference numeral 74 and is carried directly on the main shaft 10. It should be pointed out that the distributor 74 is non-rotatable, but that one of the contacts of each pair is carried by the main shaft 10 and one by the distributor with appropriate provision for proper spark setting. A line 76 leads to a spark contact 78 where the spark is delivered to a plug 52 as the plug passes during rotational movement with a wall 144 or 146. It is to be understood that the bottom surface of the contactor 78 can be of elongated configuration, so that the spark can be retarded or advanced as is necessary for proper operation of the engine, centrifugal spark advance being provided in distributor 74.

*The carburetor*

The shaft 120s of the intake and compression rotary disc 120 is hollow. Advantage is taken of this feature for carburetion. Thus, the interior of the hollow shaft 120s is shaped like a venturi tube and a non-rotatable but adjustable damper 80 is positioned within the venturi throat so that it can have freedom of pivotal movement on support 81. This will control the intake of the gaseous mixture and consequently the speed of the engine. The intake gases are then passed through tube borings 82, one or each wall 144 and 146, thus passing through the sphere half 118b. The gases pass upwardly through bores 84 in power disc half 114b where they are directed to ports contained within walls 144 and 146.

The carburetor spray nozzle is designated by reference numeral 86 and is placed stationary within the hollow shaft 120s. In this way, a simple carburetor is formed. A stationary shield designated 88, of annular configuration and truncated conical form is supported on arm 90. Positioned around the shaft 10, this shield 88 forms a venturi throat to aspirate the incoming air into admixture with the fuel from spray nozzle 86. Of course, a suitable float control will be provided for proper application of the fuel. In addition to the foregoing, it is to be understood that other arrangements can be utilized in feeding fuel to the combustion chambers of the present invention. Thus, the foregoing is understood to be an operable embodiment, but exemplary in form and not limiting upon the invention.

Transfer porting and valving

In view of the foregoing description, setting forth the various larger elements of the invention and their operable relationship, the transfer porting and operation of the invention will now be described.

Figure 3:
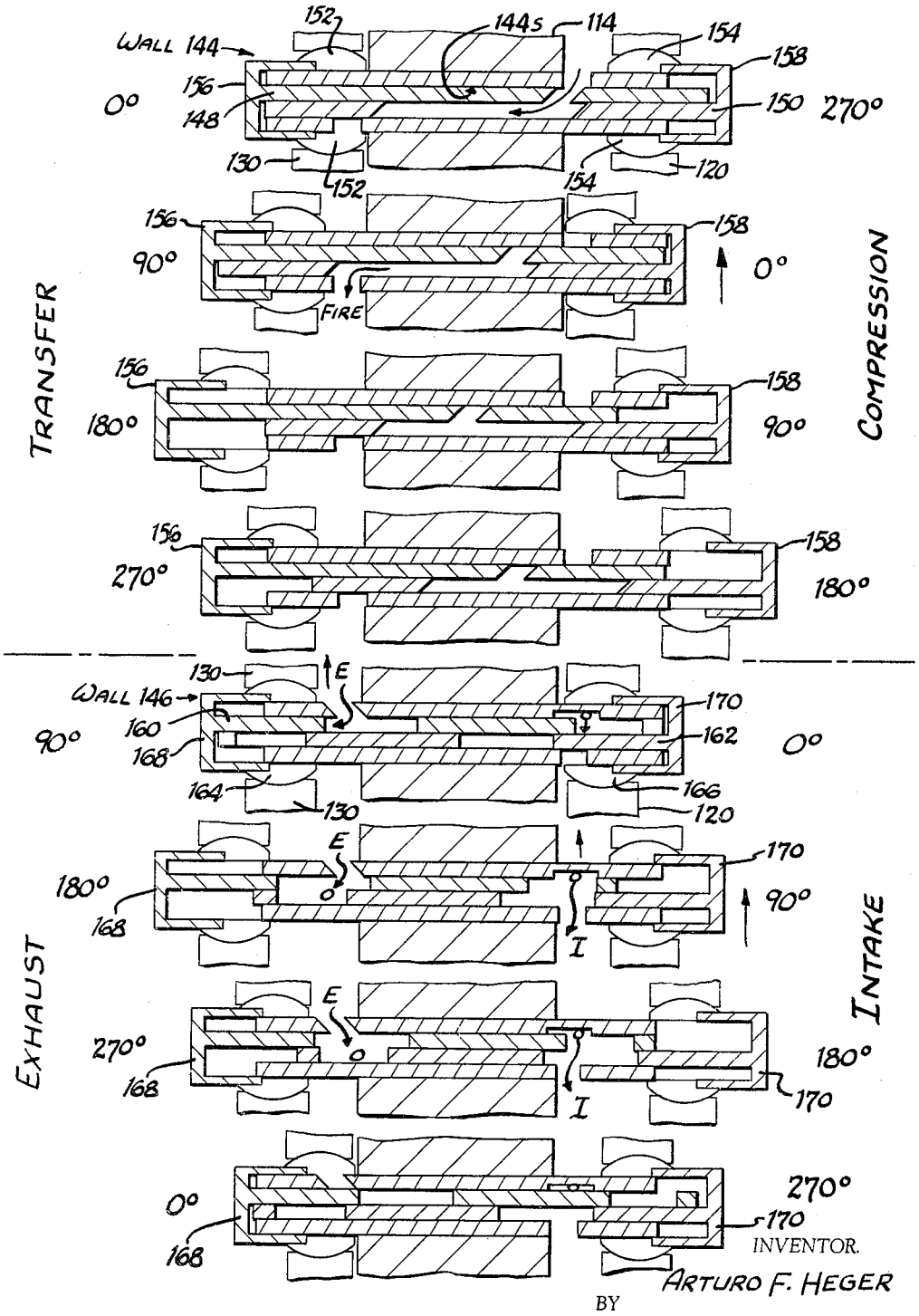
FIGURE 3 is a schematic view illustrating operation of the valves during rotation of the engine.

By referring to FIGURE 3 of the drawings, gas transfer from the intake and compression side to the combustion and exhaust side of the engine are shown. By reference to FIGURE 4 of the drawings, schematic gas flow is shown.

Relative to FIGURE 3, it is to be understood that there are appropriate transfer ports located in the walls 144 and 146 and that these are controlled by two sliding vanes which are located within corresponding slots inside the walls 144 and 146. Thus, the wall 144 contains a central slot 144s within which two vanes 148 and 150 are slidably mounted. Half moon shoes designated by the reference numerals 152 and 154 are respectively mounted within the discs 130 and 120. To the shoes 152, there is fixedly attached a yoke 156 that is in turn connected to vane 148. Thus, as the shoes are moved, the vane 148 is also moved. Similarly, a yoke 158 is connected to half moon shoes 154 and also to vane 150 for actuating that vane as the half moon shoes are moved by rotation of the disc 120 and consequent movement of shoes 154 toward and from center disc 114. It will thus be understood that as the discs move toward and away from one another, the vanes are moved to provide proper valving.

Wall 146 also contains a central slot 146s within which two vanes 160 and 162 are slidably mounted. Half moon shoes designated by reference numerals 164 and 166 are respectively mounted within discs 130 and 120. To the shoes 164, there is fixedly connected a yoke 168. That is in turn connected to vane 160. Thus, as shoes 164 are moved, vane 160 is also moved. Similarly, a yoke 170 is connected to the half moon shoes 166 for actuating vane 162.

Operation

Let us refer now to both FIGURES 3 and 4 of the drawings.

*FIGURE 3.*—First it should be pointed out that FIG-3 represents the dividing walls 144 and 146 of FIGURE 2 and the vanes and actuating half moon shoes constituting the valving. The right side of the drawing depicts the Intake and Compression side; the left the Combustion and Exhaust side.

*FIGURE 4.*—Secondly, it should be pointed out that FIGURE 4 of the drawings represents a schematic operation of the engine during four rotations representing four cycles or a single power pulse. Please observe that the top half of FIGURE 4, namely positions 1–7, represents the Intake and Compression side of the engine. The bottom half of FIGURE 4, namely positions 8–14, represents the Combustion and Exhaust side of the engine. These must be kept clearly in mind for a clear understanding of the operation of the invention. Thus, we must understand that the gases are taken in and compressed on one side of the engine; then passed to the other side and burned and exhausted.

Relative to FIGURE 4, positions 1–7, the solid line 134 represents the contact line or cylinder head on the Intake and Compression side. This does not change.

In FIGURE 4, positions 8–14, the solid line 132 represents the cylinder head on the Combustion and Exhaust side as shown in FIGURE 1 also. This, as pointed out before, is the contact point between the combustion and exhaust disc 130 and the central power disc 114. This does not change.

*FIGURE 4, position 1.*—This is the 0° starts position; note the 0° position of wall 144. The cavity that is about to develop is indicated by the X mark. Note that wall 144 is the only wall that is now about to be in operation as concerns intake for the cycle being described. Wall 146 comes into play later. It is at this point that the engine begins to intake.

This position of wall 144 is the 0° Intake position shown in FIGURE 3. The intake valve O is just about to begin opening.

*FIGURE 4, position 2.*—Observe that the cavity X is enlarging in size and drawing in combustion mixture. Note the open position of the valving in FIGURE 3, 90° Intake.

*FIGURE 4, position 3.*—For 180° now, the wall 144 has been causing the cavity X to enlarge and in this position wall 146 will come into play as it passes the cylinder head 34 to define the cavity X. This is the two-thirds intake position. Note 180°, still open, Intake in FIGURE 3.

*FIGURE 4, position 4.*—Cavity X is at its maximum size, full intake position at this point. Valves are now closed as at 270° Intake FIGURE 3. Compression is about to begin. Note that wall 144 has moved through 270° and wall 146 has been effective through 90°.

*FIGURE 4, position 5.*—Cavity X has grown smaller and one-third compression has been effected. Wall 144 now passes out of play and wall 146 takes over the job. Note the 180° Compression position in FIGURE 3. No valves are open; thus the gases are retained in the cavity X while they are being compressed.

*FIGURE 4, positions 6 and 8.*—Position 6: This is the two-thirds compression position, wall 146 having moved through 270°. This is the start of the transfer of the compressed gases to the other side of the engine. Note the 270° position, Compression, FIGURE 3. The gases will actually pass across during the next quarter turn.

Position 8: We must now recognize the condition of the engine on the combustion and exhaust side. Thus looking at FIGURE 8, which is the 0° position on the other side of the engine, we are just ready to start the transfer of gases from the intake side to the combustion side. This condition is shown at 0° position Transfer in FIGURE 3. The valves have not yet opened, but are ready to open.

From the foregoing, it must be understood that in FIGURE 4, positions 6 and 8 must be considered together because this is where the overlap starts.

*FIGURE 4, positions 7 and 9.*—First referring to FIGURE 4, position 7, a full turn has now been completed. Cavity X has been reduced to 0 volume. Thus, the compressed gases have been fully transferred and compressed into the other side of the engine. Attention is directed to 0° Compression, FIGURE 3.

Position 9: Looking at the other side of the engine, the wall 146 has moved 90° to form a cavity X to receive the transferred gases. This is 90° Transfer in FIGURE 3. Note that the valve has opened into the chamber X. It is in this quadrant or at this point that the spark plug is fired and the gases in cavity X, position 9,, FIGURE 4 are ignited.

*FIGURE 4, position 10.*—Wall 146 has moved to 180°. This represents a two-thirds firing or expansion of the burning gases in the combustion chamber. Wall 144 has now moved to the 0° point or cylinder head and is ready to take over and form a cavity with the assistance of wall 146.

This point is shown by 180° Transfer, FIGURE 3.

*FIGURE 4, position 11.*—The combustion space X has reached maximum size and the gases are fully expanded. Wall 146 has moved through 270° and wall 144 has followed by moving through 90°. Since the gases have reached maximum expansion, they are ready to start the exhaust. The position of wall 144 is shown Transfer 270°, FIGURE 3. Since, however, wall 146 contains exhaust valving, the description must now relate to the 90° position of Exhaust in FIGURE 3. Note that the exhaust valve is just ready to open.

*FIGURE 4, position 12.*—Cavity X has been reduced in size from FIGURE 4, position 11, by the next 90° rotation. Wall 146 is at the engine head point and passes out of operation. Thus, wall 144 takes over at this point. The exhaust valve in wall 144 is now fully open as shown in 180° Exhaust in FIGURE 3. The exhaust is now one-third completed.

FIGURE 4, position 13.—Wall 144 has moved through 270° now and the exhaust is two-thirds completed. This is shown in 270° Exhaust open, FIGURE 3.

FIGURE 4, position 14.—The cycle is now completed by the wall 144 moving to the cylinder head point. The exhaust has been completed. The exhaust valve now must be fully closed, so that the cycle can start over. This condition of the engine is shown at 0° Exhaust in FIGURE 3.

EXTENDED SCOPE OF INVENTION

It is to be understood that the principles involved in the present invention are applicable in two-cycle as well as four-cycle engines, steam engines or more broadly fluid motors and fluid compressors or pumps.

It is to be noted that the axes of the two rotating discs 20 and 30 are at an angle to the main shaft. However, the disc that forms the combustion and exhaust chamber, designated 30, may be positioned at a smaller angle to the main shaft than the disc that forms the intake and compression chambers, designated 20. This causes the intake and compression chambers to have a bigger volume capacity than the combustion and exhaust chambers. The effect is that of a supercharged engine. The same effect can also be obtained by using a smaller inner sphere in the intake and compression chamber than in the combustion and exhaust side of the engine.

MAIN NOVELTIES

The main features of novelty apparent in the above presentation are as follows:

(1) Three axes.

(2) The porting located in the separating walls and controlling of the ports by the relationship of the axes of the intake-compression and combustion-exhaust discs acting through the half moon shoes, FIGURE 3.

(3) The supercharged effect obtainable by the different degrees of canting of the intake and compression disc compared to the combustion and exhaust side.

(4) The utilization of almost three-fourths turn of power.

(5) The direct transfer of the compressed gases from the compression chamber to the combustion chamber without decompression.

(6) Adjustable compression ratio. This is effected by mounting the intake and compression disc on a movable support so that the point of contact 34 can be changed slightly during operation of the engine.

(7) The carburetor and exhaust mechanism are novel.

(8) The centrifugal air cooling of both sides of the combustion and exhaust chambers, avoiding the necessity of a water cooling system with its various complexities.

(9) Both the inner and outer spheres forming one solid unit with the center or driving disc 14.

ADVANTAGES OF THE PRESENT INVENTION

By placing the cylinder head contact lines 90° apart, six main advantages are obtained:

(1) The correct movements of the sliding fins or vanes.

(2) The direct passage of the compression gases to the combustion chamber.

(3) A constantly increasing pressure of the gases without decreasing pressure during passage to the combustion chamber.

(4) By mounting the bearing of the intake and compression disc on an adjustable support the one-fourth turn difference between the two chambers can be varied slightly to more or less than one-fourth turn. This can be done during operation of the engine and will cause a change in the compression ratio. This advantage resides in the fact that the engine can be adjusted during operation according to its r.p.m. and to different octane fuels.

(5) Expanding gases are utilized during the approximately 250° of rotation, providing high thermal efficiency.

(6) The intake and compression are respectively performed during 270° of rotation, assuring fuel charging and maximum power output.

I claim:

1. In a rotary engine,
a main shaft having an axis,
a power disc positioned transversely of said main shaft and carrying radially spaced inner and outer spherical walls having a common center of development at the axis of the main shaft and forming an annular cavity on each side of said power disc,
an intake and compression disc of annular configuration movable within the annular cavity on one side of said power disc to define an annular chamber and having a movable seal with said spherical walls,
said intake and compression disc being mounted on an axis canted relative to said main shaft and having a surface engageable with said power disc along a line of contact,
a combustion and exhaust disc of annular configuration movable within the annular cavity on the other side of said power disc to define an annular chamber and having a movable seal with said spherical walls,
said combustion and exhaust disc being mounted on an axis canted relative to said main shaft and having a surface engageable with said power disc along a line of contact,
said line of contact of said inlet and compression disc and said line of contact of said combustion and exhaust disc being positioned approximately 90° apart,
means extending between said spherical walls to divide said annular chambers into gas-tight sub-chambers,
and means for transferring gas from one side of said power disc to the other between said sub-chambers in time with rotation of said main shaft.

2. In a rotary internal combustion engine,
a main shaft having an axis,
a power disc positioned transversely of said main shaft and carrying radially spaced inner and outer spherical walls having a common center of development at the axis of the main shaft and forming an annular cavity on each side of said power disc,
means movable within the annular cavity on one side of said power disc to define an annular intake and compression chamber of varying cross-section, developed from a first fixed radial line along one side of said power disc,
means movable within the annular cavity on the other side of said power disc to define an annular combustion and exhaust chamber of varying cross-section, developed from a second fixed radial line along the other side of said power disc,
said first and second fixed lines being spaced 90° on said power disc,
means extending between said spherical walls to divide said annular chambers into gas-tight sub-chambers,
and means for transferring gas from one of said annular chambers to the other in timed relation with rotation of said main shaft.

3. The invention of claim 2 wherein said means movable within annular cavity on one side of said power disc to define an annular intake and compression chamber is an inlet and compression disc of annular configuration and having a movable seal with said spherical walls,
said intake and compression disc being mounted on an axis canted relative to said main shaft and having a surface engageable with said power disc to provide a movable seal, said means movable within the annular cavity on the other side of said power disc to define an annular combustion and exhaust chamber is a combustion and exhaust disc of annular configuration and having a movable seal with said spherical walls, and said combustion and exhaust disc being mounted on an axis canted relative to said main shaft and having a surface engageable with said power disc to provide a movable seal.

4. The invention as defined in claim 2, including means for introducing a combustion gas into said intake chamber, and means for removing exhaust gases from said exhaust chamber.

5. The invention of claim 2 wherein said means movable within the annular cavity on one side of said power disc defining an annular intake and compression chamber is a second disc, seal means between said second disc and said power disc, and wherein said means movable within the annular cavity on the other side of said power disc to define an annular combustion and exhaust chamber is a third disc, seal means between said third disc and said power disc, means for introducing a combustion gas into a sub-chamber on one side of said power disc, and means for removing exhaust gases from one of said sub-chamber on the other side of said power disc.

6. In a rotary engine, a main shaft having an axis, a power disc positioned transversely of said main shaft and carrying radially spaced inner and outer spherical walls having a common center of development at the axis of the main shaft and forming an annular cavity on each side of said power disc, an intake and compression disc of annular configuration movable within the annular cavity on one side of said power disc to define an annular chamber and having a movable seal with said spherical walls, said intake and compression disc being mounted on an axis canted relative to said main shaft and having a surface engageable with said power disc along a first radial line extending between said inner and outer spheres, a combustion and exhaust disc of annular configuration movable within the annular cavity on the other side of said power disc to define an annular chamber and having a movable seal with said spherical wall, said combustion and exhaust disc being mounted on an axis canted relative to said main shaft and having a surface engageable with said power disc along a second radial line extending between said inner and outer spheres, said second radial line being positioned approximately 90° forward of said first line relative to the direction of engine rotation, at least one radial wall extending between said spherical walls integral with said power disc to divide said annular chambers into gas-tight sub-chambers, and means for transferring gas from an intake and compression sub-chamber to a combustion and exhaust chamber in time with rotation of said main shaft.

7. In a fluid motor, a main shaft having an axis, disc means positioned transversely of said main shaft and carrying radially spaced inner and outer spherical walls having a common center of development at the axis of the main shaft and forming an annular chamber on each side of said disc means, means forming the annular chamber on each side of said disc means into chambers of varying cross-section and developed from first and second radial lines on said disc, 180° spaced means extending between said spherical walls to divide said annular chambers into fluid-tight sub-chambers, means for transferring fluid from one of said sub-chambers on one side of said disc to one of said sub-chambers on the other side of said disc in time with rotation of said main shaft, and said first and second radial lines being positioned 90° apart.

8. In a fluid motor, a main shaft having an axis, a first disc positioned transversely of said main shaft and carrying radially spaced inner and outer spherical walls having a common center of development at the axis of the main shaft and forming an annular cavity on each side of said power disc, a second disc of annular configuration movable within the annular cavity on one side of said first disc to define an annular chamber and having a movable seal with said spherical walls, said second disc being mounted on an axis canted relative to said main shaft axis and having a surface engageable with said first disc along a radial line of contact, a third disc of annular configuration movable within the annular cavity on the other side of said first disc to define an annular chamber and having a movable seal with said spherical walls, said third disc being mounted on an axis canted relative to said main shaft and having a surface engageable with said first disc along a radial line of contact, said lines of contact being spaced 90° apart, means extending between said spherical walls to divide said annular chambers into fluid-tight sub-chambers, and means for transferring fluid from one of said sub-chambers on one side of said disc to one of said sub-chambers on the other side of said disc in time with rotation of said main shaft.

References Cited by the Examiner
UNITED STATES PATENTS

| | | | |
|---|---|---|---|
| 865,891 | 9/07 | Heberling et al. | 123—8 |
| 1,006,546 | 10/11 | Groh | 91—82 X |
| 2,681,046 | 6/54 | Barrett | 91—82 |

KARL J. ALBRECHT, *Primary Examiner.*

JOSEPH H. BRANSON, Jr., *Examiner.*